United States Patent
Bristow

(10) Patent No.: US 10,874,106 B2
(45) Date of Patent: Dec. 29, 2020

(54) METHOD OF REGULATING PLANT GROWTH

(71) Applicant: ROTAM AGROCHEM INTERNATIONAL COMPANY LIMITED, Hong Kong (CN)

(72) Inventor: James Timothy Bristow, Hong Kong (CN)

(73) Assignee: ROTAM AGROCHEM INTERNATIONAL COMPANY LIMITED, Hong Kong (CN)

(*) Notice: Subject to any disclaimer, the term of this patent is extended or adjusted under 35 U.S.C. 154(b) by 0 days.

(21) Appl. No.: 14/894,575

(22) PCT Filed: Nov. 26, 2013

(86) PCT No.: PCT/CN2013/087847
§ 371 (c)(1),
(2) Date: Nov. 30, 2015

(87) PCT Pub. No.: WO2014/101608
PCT Pub. Date: Jul. 3, 2014

(65) Prior Publication Data
US 2016/0106101 A1 Apr. 21, 2016

(30) Foreign Application Priority Data
Dec. 24, 2012 (GB) .................................. 1223379.7

(51) Int. Cl.
*A01N 43/80* (2006.01)
*B01J 13/16* (2006.01)
*A01N 25/28* (2006.01)

(52) U.S. Cl.
CPC ............. *A01N 43/80* (2013.01); *A01N 25/28* (2013.01); *B01J 13/16* (2013.01)

(58) Field of Classification Search
CPC .......... A01N 43/80; A01N 25/28; B01J 13/16
See application file for complete search history.

(56) References Cited

U.S. PATENT DOCUMENTS

| | | | |
|---|---|---|---|
| 4,405,357 A | 9/1983 | Chang | |
| 4,435,202 A | 3/1984 | Koizumi et al. | |
| 4,826,527 A | 5/1989 | Chang et al. | |
| 4,892,578 A | 1/1990 | Chang et al. | |
| 5,583,090 A | 12/1996 | Stern et al. | |
| 5,597,780 A | 1/1997 | Lee et al. | |
| 5,783,520 A | 7/1998 | Anderson et al. | |
| 6,380,133 B2 | 4/2002 | Becker et al. | |
| 6,440,902 B1 | 8/2002 | Szamosi | |
| 6,797,277 B2 | 9/2004 | Heier et al. | |
| 2001/0041659 A1 | 11/2001 | Becker et al. | |
| 2001/0051591 A1* | 12/2001 | Ferrett | A01N 57/20 504/103 |
| 2010/0234225 A1 | 9/2010 | Dexter et al. | |
| 2010/0279864 A1* | 11/2010 | Mann | A01N 43/90 504/106 |
| 2016/0106101 A1 | 4/2016 | Bristow | |

FOREIGN PATENT DOCUMENTS

| | | |
|---|---|---|
| CN | 1276153 | 12/2000 |
| CN | 101578044 A | 11/2009 |
| EA | 015571 B1 | 10/2011 |
| FR | 2483406 A1 | 12/1981 |
| GB | 2496327 | 5/2013 |
| GB | 2496327 A | 5/2013 |
| WO | WO0010392 A1 | 3/2000 |
| WO | 2007101019 A2 | 9/2007 |
| WO | 2008085958 A1 | 7/2008 |

OTHER PUBLICATIONS

Command 3 ME Microencapsulated Herbicide, Material Safety Data Sheet, 2001, FMC, Version Gobal, Revision No. 5, 1-6.*
Command 3ME Microencapsulated Herbicide, Product Label, 2003, FMC Corporation, 20 pages (Year: 2003).*
Bushundial, D.P., Pre-early Post-emergent weed control for sugar cane in Guyana, 1991, Proceedings of the 24th West Indies Sugar Techologists' Conference, Kingston, Jamaica, CABI Abstract. (Year: 1991).*
Richard, Jr., Edward, Sugarcane (*Saccharum* spp. hybrids) Tolerance to Clomazone, 1996, Weed Technology, vol. 10, Abstract (Year: 1996).*
International Search Report for Priority Application PCT/CN2013/087847 dated 27 Feb. 27, 2014.
R. Bras. Fisiol. Veg., 4(2):81-86, 1992—Pigments Accumulation, Photosynthetic, Respiratory and Growth Rates in Soybean, Rice and Water-Grass as Effected by Chlomazone Doses.
Correspondence: N. D. Camper, Department of Plant Pathology and Physiology, Clemson University, Clemson, SC 29631, USA—Journal of Environmental Science and Health, Part B—Pesticides, Food Contaminants, and Agricultural Wastes, vol. B38, No. 6, pp. 747-755, 2003—Light and Clomazone Effects on Tobacco (*Nicotiana tabacum*) Callus and Leaf Discs.

(Continued)

*Primary Examiner* — John Pak
*Assistant Examiner* — Andriae M Holt
(74) *Attorney, Agent, or Firm* — Dickinson Wright PLLC

(57) ABSTRACT

A method for improving the growth of target plants at a locus is provided, the method comprising applying to the locus a growth-improving amount of compound (I):

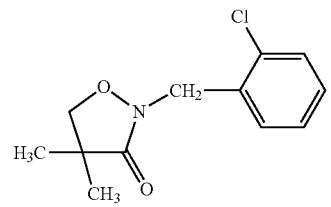

The method is suitable for improving the growth of a range of target plants, in particular improving the growth of sugarcane, rice, soybeans, oilseed rape and potato crops.

10 Claims, No Drawings

(56) References Cited

OTHER PUBLICATIONS

European Search Report dated Apr. 22, 2016.
E.P. Webster et al., "The Potential for Clomazone Use in Rice (*Oryza sativa*)", Weed Technology, vol. 13, 1999, pp. 390-393.

\* cited by examiner

METHOD OF REGULATING PLANT GROWTH

The present invention relates to a method of regulating the growth of plants, in particular for improving the growth of the target plants.

Various methods of regulating the growth of target plants, in particular to improve plant growth, are described in the literature. These methods are typically based on conventional fertilizing. The biological effects of those known methods are not entirely demonstrated in the agriculture area. Thus, there is a high demand in the agricultural industry to provide techniques to improve the growth of the desired plants, in particular for obtaining higher crop yields, as well as the reduction of the use of the quantity of fertilizers needed to be applied to the target plants to improve their growth and yields.

It is known that certain isoxazolidinones are active as herbicides and are useful in the control of unwanted plant growth. One particular isoxazolidinone of commercial importance is 2-(2-chlorophenyl)methyl-4,4-dimethyl-3-isoxazolidinone, known in the art and referred to hereinafter by the common name clomazone. The herbicidal active compound clomazone is known from U.S. Pat. No. 4,405,357 and is generally used to control weeds and unwanted plant growth in various crops. Clomazone is a compound having the general formula (I).

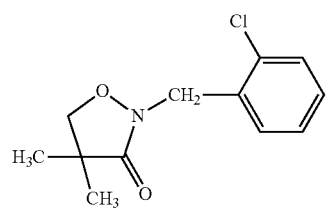

Clomazone is known to be a very volatile organic compound. In particular, the volatility of the compound is such that, once applied to plants in a target area can move to adjacent areas outside of the target area. As a result of this movement or drift to non-target areas, plants in those areas may suffer damage as a result of the effects of clomazone. In particular, clomazone can cause discoloration of the foliage, most typically whitening or some degree of bleaching, of a variety of crops, trees, or decorative plants. This bleaching may be temporary when the plants are exposed to sufficiently low concentrations of clomazone. Nevertheless, it is undesirable, even when not causing the destruction of the affected plant. At higher concentrations, the plants may be permanently damaged or even killed.

As a result, appropriate instructions for the handling and use of clomazone are typically found on product labels of commercially available clomazone products, in particular on emulsifiable concentrate (EC) formulations comprising clomazone, in order to limit or prevent exposure of sensitive plants in non-target areas to potentially damaging concentrations of clomazone.

As a result of the high volatility of clomazone and the resultant problems in handling and applying clomazone-containing formulations in the field, techniques have been developed to reduce or prevent the drift of clomazone once applied to a target locus. In particular, techniques of formulating clomazone to reduce its volatility, thereby to reduce or prevent vapor transfer of clomazone to plants which are not the target of application have been proposed in the art. For example, U.S. Pat. Nos. 5,597,780 and 5,583,090 describe encapsulation techniques, in which microcapsule suspension formulations of clomazone are prepared. Similar formulations comprising microencapsulated clomazone, their preparation and use are disclosed in European Patent Application publication Nos. EP 1 840 145 and EP 2 487 192.

Clomazone is known to be active as a broad spectrum herbicide with its ability to control annual grasses and broadleaf weeds in various crops. It has now surprisingly been discovered that clomazone is active in improving the growth of target plants.

Accordingly, according to the present invention there is described a method for improving the growth of target plants at a locus, the method comprising applying to the locus a growth-improving amount of compound (I):

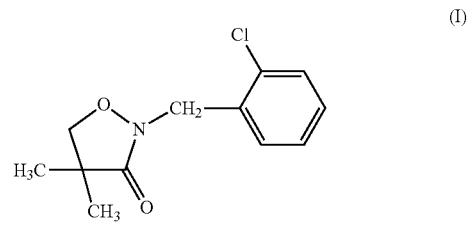 [SMILES: CC1(C)CON(Cc2ccccc2Cl)C1=O]

It has now been found that the application of compound (I) can result in an improvement of the growth of the plant. In this respect, the growth of a plant is considered to have improved growth if it exhibits at least a 10% improvement or increase in one or more of earlier emergence, crop yields, more developed root system, plant height, bigger leaf blade, increased shoot growth, and improved plant vigor, and/or at least a 10% decrease in the amount of fertilizer or a 10% decrease in the number of seeds required to achieve a predetermined crop yield from the locus. In this respect, a growth-improving amount of clomazone is to be understood accordingly as an amount of clomazone required to achieve the aforementioned improvement in growth of the target plants.

The clomazone may be applied to the target plants with the locus in any suitable condition. Especially preferred is the use of the clomazone in the method for the improvement of the growth of the target plants which are essentially free of weeds, more particularly essentially free of annual grasses and broadleaf weeds.

A further aspect of the invention there is provided the use of compound (I) for improving the growth of target plants at a locus.

Crops which can be improved according to the method of the present invention include cereals, such as wheat, barley, rye, oats, rice, maize and sorghum; beet, such as sugar beet and fodder beet; fruit, for example pomes, stone fruit and soft fruit, such as apples, pears, plums, peaches, almonds, cherries and berries, e.g. strawberries, raspberries and blackberries; leguminous fruits, such as beans, lentils, peas and soybeans; oil plants, such as oilseed rape, mustard, poppy, olives, sunflowers, coconut, castor oil plants, cocoa beans and groundnuts; cucurbitaceae, such as marrows, cucumbersand melons; fibre plants, such as cotton, flax, hemp and jute; citrus fruit, such as oranges, lemons, grapefruit and mandarins; vegetables, such as spinach, lettuce, asparagus, cabbages, carrots, onions, tomatoes, potatoes and paprika; lauraceae, such as avocados, cinnamon and camphor; and also tobacco, nuts, coffee, aubergines, sugar cane, tea, pepper, vines, hops, bananas, natural rubber plants and ornamentals; especially sugarcane, rice, beans, soybeans, oilseed rape and potatoes.

It has been found that the present invention is particular advantageous in improving the growth of sugarcane, rice, soybeans, oilseed rape and potato crops.

As noted above, in the method of the present invention, the growth of the target plants at the locus is improved by applying to the locus a composition comprising clomazone. Clomazone may be applied to the locus in any suitable composition or formulation. Clomazone is preferably applied to the locus together with at least one adjuvant. The adjuvants customarily used in the formulation of agrochemical products are well known in the art and understood by the person skilled in the art. Suitable adjuvants include such components as extenders, for example solvents or solid carriers, stabilisers, slow-release adjuvants, dyes and one or more surface-active substances (surfactants). Suitable carriers and adjuvants in this case include all substances customarily used in the formulation of crop protection products, especially in products for controlling plant growth. Suitable adjuvants, such as solvents, solid carriers, surface-active compounds, non-ionic surfactants, cationic surfactants, anionic surfactants and further adjuvants in the compositions used in accordance with the invention are, for example, the same as those described in EP 0 736 252.

The preparation and use of suitable clomazone formulations are known in the art and clomazone formulations are commercially available. Examples of suitable clomazone formulations include emulsifiable concentrates (EC), suspension concentrates (SC), directly sprayable or dilutable solutions, coatable pastes, dilute emulsions, wettable powders (WP), soluble powders, dispersible powders, dusts or granules. In a preferred embodiment, clomazone is present in the formulation in an encapsulated form, that is an encapsulation in polymeric substances. As noted above, such microencapsulated forms of clomazone are known in the art.

As noted above, a preferred embodiment of the present invention comprises applying to the locus to be treated clomazone in a microencapsulated form. Formulations comprising microencapsulated active agrochemical components, in particular clomazone, are known in the art and are commercially available. The microencapsulated clomazone comprises microcapsules having a polymer shell and a core, the core containing clomazone, optionally with one or more other components, such as a solvent and other adjuvents or excipients typically employed in agrochemical formulations. The polymer shell may be of any suitable polymer material and the microcapsules formed by any suitable method. Preferably, the polymer shell is formed using an interfacial polymerisation technique. Examples of suitable polymers include polyamides, polyesters, polyurethanes and polyureas. The polymer is preferably a polyurea, in particular a polyurea formed from the reaction of one or more isocyanate compounds and one or more amine compounds. Such reactions are known in the art and the reactants known and commercially available.

Examples of microencapsulation suitable for use in preparing the clomazone for inclusion in the granules of the present invention are disclosed in EP 0 719 087, EP 0 792 100, EP 0 854 675, EP 1 104 991, EP 1 164 849, EP 1 404 176, EP 1 928 593, EP 2 133 140, WO 01/24631, WO 03/099005, WO 96/22159, WO 2007/072046, WO 2007/101019, WO 2009/00545, and WO 2009/086914.

An example of a formulation of a microencapsulated form of clomazone in granules suitable for use in the present invention is disclosed in United Kingdom Patent No. GB 2478317.

The clomazone composition may comprise further components, in addition to those discussed above. Examples of such components include those components commonly included in agrochemical formulations and include one or more components selected from biocides, adjuvants, and activity modifiers, including safeners and synergising agents of the active ingredients. Such components are commercially available and their use is known in the art.

The clomazone composition may comprise any suitable amount of clomazone, sufficient to allow a growth-improving amount of clomazone to the target locus. The composition may contain clomazone in an amount of from 0.1 to 99% by weight, more especially from 0.1 to 95%.

Whereas commercial products will preferably be formulated as concentrates, the end user will normally employ dilute formulations which have considerably lower concentrations of clomazone, for example by diluting or dispersing the clomazone formulation in a suitable carrier, in particular water.

The rate at which clomazone is applied to the locus being treated is at least sufficient to obtain an improvement in the growth of the target plants at the locus, as indicated above. This rate may be in the range of from 0.01 to 3.0 kg/hectare, more preferably from 0.05 to 2.0 kg/hectare, still more preferably from 0.05 to 1.5 kg/hectare, provided that the improvement in the growth of the target plants is obtained.

Clomazone may be the sole active ingredient present in the composition applied to the locus. Alternatively, clomazone may be present in combination with one more other active ingredients. Compatible active components that may be applied together with clomazone to the locus include one or more other herbicides, insecticides, fungicides, nematocides, plant growth regulators, and/or safeners. Suitable active components are known in the field and are available commercially. They may be formulated with clomazone using techniques known in the art.

As noted above, it has been found that target plants at the locus exhibit improved growth as a result of treatment with clomazone. Accordingly, the benefit of the present invention may be realized by reducing the amount of fertilizer applied to the locus, while still achieving the same growth characteristics of the target plants. The reduction in fertilizer may be at least 10% by weight.

The method of treating plants and the use of clomazone of the present invention are described, for illustrative purposes, by way of the following examples.

EXAMPLES

Example 1

Sugarcane plants are treated by the application of a commercially available concentrate formulation of clomazone (Centium 360 CS®; a suspension concentrate of microencapsulated clomazone at a concentration of 360 g/l). The concentrate formulation is dispersed in water and diluted, in a manner conventional in the art, to give an aqueous spray composition. The spray composition is applied to the sugarcane plants in an amount to apply clomazone at a rate of 120 g/hectare.

The growth of the sugarcane plants is monitored and compared with the growth of sugarcane plants grown under the same conditions, but without treatment with clomazone.

It is observed that the growth of the treated sugarcane plants is significantly improved, in comparison to the untreated plants, in particular with the treated plants exhibiting a larger average leaf blade area, increased shoot growth and growing to a greater average height.

Example 2

Young rice plants are treated in an analogous manner to that described in Example 1.

The growth of the rice plants is monitored and compared with the growth of rice plants of the same age and grown under the same conditions, but without treatment with clomazone.

It is observed that the growth of the treated rice plants is significantly improved, in comparison to the untreated plants, in particular with the treated plants exhibiting a larger average leaf blade area, increased shoot growth and growing to a greater average height.

Example 3

Young soybean plants are treated in an analogous manner to that described in Example 1.

The growth of the soybean plants is monitored and compared with the growth of soybean plants of the same age and grown under the same conditions, but without treatment with clomazone.

It is observed that the growth of the treated soybean plants is significantly improved, in comparison to the untreated plants, in particular with the treated plants exhibiting a larger average leaf blade area, increased shoot growth and growing to a greater average height.

Example 4

Young oilseed rape plants are treated in an analogous manner to that described in Example 1.

The growth of the oilseed rape plants is monitored and compared with the growth of oilseed rape plants of the same age and grown under the same conditions, but without treatment with clomazone.

It is observed that the growth of the treated oilseed rape plants is significantly improved, in comparison to the untreated plants, in particular with the treated plants exhibiting a larger average leaf blade area, increased shoot growth and growing to a greater average height.

Example 5

Young potato plants are treated in an analogous manner to that described in Example 1.

The growth of the potato plants is monitored and compared with the growth of potato plants of the same age and grown under the same conditions, but without treatment with clomazone.

It is observed that the growth of the treated potato plants is significantly improved, in comparison to the untreated plants, in particular with the treated plants exhibiting a larger average leaf blade area, increased shoot growth and growing to a greater average height.

The invention claimed is:

1. A method for improving the growth of target plants at a locus, the method comprising the steps of:
   a) preparing a growth improving composition having a growth improving compound consisting essentially of compound (I) and wherein compound (I) is microencapsulated and the only herbicide in the composition

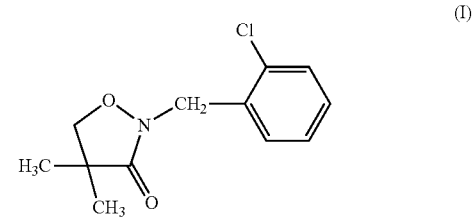 [SMILES: CC1(C)CON(Cc2ccccc2Cl)C1=O]

(I)

b) applying the growth improving composition of step a) directly to a post-emergent target plant selected from the group consisting of corn, bean, soybean, oilseed rape, potato, and mixtures thereof, the target plant being free of annual grasses and broadleaf weeds at the time of application, and applying at the locus in an amount ranging from 0.05 to 1.5 kg/hectare wherein said amount applied is sufficient to cause an increase of at least 10%, compared to an untreated target plant, in an average value of at least one measure of the target plant selected from the group consisting of crop yield, root system size, leaf blade area, shoot growth, plant height, and mixtures thereof.

2. The method according to claim 1, further comprising applying to the locus at least one additional compound selected from the group consisting of insecticides, fungicides, nematocides, and/or safeners in addition to the growth improving composition of step a).

3. The method according to claim 1, wherein an amount of fertilizer applied to the locus is reduced by at least 10% by weight from the amount that would be applied to achieve the same plant growth without treatment with the growth improving composition containing compound (I).

4. A method for improving the growth of target plants at a locus, the method comprising the steps of:
   a) preparing a growth improving composition comprising compound (I), wherein compound (I) is the only herbicide in the composition and wherein compound (I) is microencapsulated

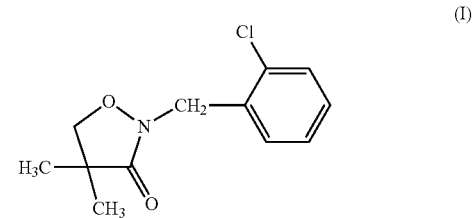 [SMILES: CC1(C)CON(Cc2ccccc2Cl)C1=O]

(I)

b) applying the growth improving composition of step a) directly to a post-emergent target plant selected from the group consisting of corn, bean, soybean, oilseed rape, potato, and mixtures thereof, the target plant being free of annual grasses and broadleaf weeds at the time of application, and applying at the locus in an amount ranging from 0.05 to 1.5 kg/hectare wherein said amount applied is sufficient to cause an increase of at least 10%, compared to an untreated target plant, in an average value of at least one measure of the target plant selected from the group consisting of crop yield, root system size, leaf blade area, shoot growth, plant height, and mixtures thereof.

5. The method according to claim 4, further comprising applying to the locus at least one additional compound selected from the group consisting of insecticides, fungicides, nematocides, and/or safeners in addition to the growth improving composition of step a).

6. The method according to claim 4, wherein an amount of fertilizer applied to the locus is reduced by at least 10% by weight from the amount that would be applied to achieve the same plant growth without treatment with the growth improving composition containing compound (I).

7. The method according to claim 4, wherein the composition of step a) further comprises at least one adjuvant comprising an extender, a stabilizer, a slow-release adjuvant, a dye, a surfactant, or mixtures thereof.

8. A method for improving the growth of target plants at a locus, the method comprising the steps of:
   a) preparing a growth improving composition comprising compound (I), wherein compound (I) is microencapsulated, the only active growth improving component in the composition and the only herbicide in the composition

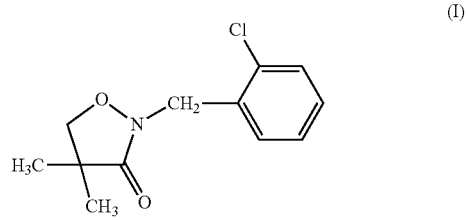 [SMILES: CC1(C)CON(Cc2ccccc2Cl)C1=O]

b) applying the growth improving composition of step a) directly to a post-emergent target plant selected from the group consisting of corn, bean, soybean, oilseed rape, potato, and mixtures thereof, the target plant being free of annual grasses and broadleaf weeds at the time of application, and applying at the locus in an amount ranging from 0.05 to 1.5 kg/hectare wherein said amount applied is sufficient to cause an increase of at least 10%, compared to an untreated target plant, in an average value of at least one measure of the target plant selected from the group consisting of crop yield, root system size, leaf blade area, shoot growth, plant height, and mixtures thereof.

9. The method according to claim 8, further comprising applying to the locus at least one additional compound selected from the group consisting of insecticides, fungicides, and nematocides in addition to the growth improving composition of step a).

10. The method according to claim 8, wherein the composition of step a) further comprises at least one adjuvant comprising an extender, a stabilizer, a slow-release adjuvant, a dye, a surfactant, or mixtures thereof.

\* \* \* \* \*